United States Patent
Mio

Patent Number: 5,799,144
Date of Patent: Aug. 25, 1998

[54] MICROCOMPUTER FOR RESOLVING PROBLEMS FOUND IN A PROGRAM STORED IN A ROM

[75] Inventor: Masao Mio, Tokyo, Japan

[73] Assignee: Mitsubishi Denki Kabushiki Kaisha, Tokyo, Japan

[21] Appl. No.: 757,751

[22] Filed: Nov. 26, 1996

[30] Foreign Application Priority Data

May 31, 1996 [JP] Japan ................. 8-139138

[51] Int. Cl.$^6$ ................. G06F 11/00
[52] U.S. Cl. ........... 395/183.14; 395/584; 395/182.06; 371/102
[58] Field of Search ........... 395/182.06, 182.05, 395/182.04, 183.11, 183.14, 580, 583, 584, 585, 586, 587, 571; 371/10.2

[56] References Cited

U.S. PATENT DOCUMENTS

| | | | |
|---|---|---|---|
| 4,542,453 | 9/1985 | Patrick et al. | 395/182.06 |
| 4,751,703 | 6/1988 | Picon et al. | 395/182.06 |
| 4,769,767 | 9/1988 | Hilbrink | 395/182.06 |
| 4,847,753 | 7/1989 | Matsuo et al. | 364/200 |
| 4,992,932 | 2/1991 | Ohshima | 364/200 |
| 5,051,897 | 9/1991 | Yamaguchi et al. | 364/200 |
| 5,072,364 | 12/1991 | Jardine et al. | 395/375 |
| 5,251,174 | 10/1993 | Hwang | 395/182.05 |
| 5,454,100 | 9/1995 | Sagane | 395/182.06 |
| 5,497,459 | 3/1996 | Tanihira et al. | 395/183.06 |
| 5,623,665 | 4/1997 | Shimada et al. | 395/182.06 |
| 5,652,858 | 7/1997 | Okada et al. | 395/464 |
| 5,664,135 | 9/1997 | Schlansker et al. | 395/377 |
| 5,666,482 | 9/1997 | McClure | 395/182.06 |

FOREIGN PATENT DOCUMENTS

| | | | |
|---|---|---|---|
| 3 900 187 | 9/1989 | Germany | G11C 29/00 |
| 1-232447 | 3/1988 | Japan | |
| 63-156231 | 6/1988 | Japan | G06F 9/06 |
| 63-304563 | 12/1988 | Japan | |

OTHER PUBLICATIONS

Electronics, "Ferment in Microcontrollers," pp. 59–60, Oct. 1, 1997.

*Primary Examiner*—Joseph Palys
*Attorney, Agent, or Firm*—Burns, Doane, Swecker & Mathis, LLP

[57] ABSTRACT

There is a problem that a mechanism for patching a bug of a program stored in a ROM does not function correctly when a queue buffer for prefetching an instruction is provided. According to a microcomputer of the present invention, a comparison circuit compares address information stored in a register with address data on an address bus and a latch circuit is put in a set state by a match signal activated by the comparison circuit and put in a reset state by a branch-generation signal or a JMP-instruction-code end signal. In the reset state, an operation to output data from a JMP-instruction-code ROM to a data base is disabled.

4 Claims, 9 Drawing Sheets

1

MICROCOMPUTER FOR RESOLVING PROBLEMS FOUND IN A PROGRAM STORED IN A ROM

BACKGROUND OF THE INVENTION

1. Field of the Invention

In general, the present invention relates to a microcomputer which has a ROM for storing a program and carries out processing to prefetch data from the ROM. In particular, the present invention relates to a microcomputer which can resolve problems caused by a bug found in the program stored in the ROM.

2. Description of the Prior Art

FIG. 8 is a diagram showing a conventional single-chip microcomputer that can resolve a problem arising in a program stored in a ROM thereof in conjunction with external devices. Reference numeral 100 shown in the figure denotes the single-chip microcomputer which is referred to hereafter simply as a microcomputer. Reference numeral 200 is an EEPROM for storing a corrected program. In the microcomputer 100, reference numeral 40 is a ROM unit for storing a fixed program and reference numeral 42 is a RAM unit, a writeable memory. Reference numeral 44 is register for storing specific address data and reference numeral 46 is a comparison circuit for comparing data on an address bus denoted by reference numeral 48 with the contents of the register 44. Reference numeral 50 is a data bus and reference numeral 52 is a serial output pin for outputting serial data. Reference numeral 54 is a serial input pin for inputting serial data and reference numeral 110 is a CPU. Reference numeral 120 is a JMP-instruction-code ROM unit for storing a branch instruction (JMP instruction). It should be noted that a serial input/output circuit which is not shown in the figure is actually provided between the serial output pin 52 and the serial input pin 54.

The operation of the microcomputer 100 is explained as follows.

The ROM unit 40 in the microcomputer 100 is the so-called masked ROM to which data, usually a program, is written during the manufacturing thereof and can not be altered afterwards. In some cases, however, a bug is identified in the program stored in the ROM unit 40 after the manufacturing of the ROM unit 40.

A procedure for coping with a condition in which a bug is found in a program stored in the ROM unit 40 after the microcomputer 100 has been manufactured is disclosed in, for example, JP-A-63/156231 or JP-A-1/232447. FIG. 9 is an explanatory diagram used for explaining the procedure. To be more specific, FIG. 9(a) is a diagram showing a program containing a bug and FIG. 9(b) is a diagram showing the flow of the corrected program from which the bug is removed. According to the procedure, the register 44 provided in the microprocessor 100 is used typically for storing data supplied through the serial input pin 54. Codes of JMP instructions, jmp1 to jmp4, are stored in the JMP-instruction-code ROM unit 120. It should be noted that the codes of the JMP instruction jmp1 to jmp4 are stored as four bytes of data. The operand of the JMP instruction indicates a value representing a destination address in the RAM unit 42.

When a bug of the program stored in the ROM unit 40 is found, the start address of a portion containing the bug is stored in the register 44. In the case of the program shown in FIG. 9(a), the codes of an instruction stored at the start address of a portion containing the bug are op1 to op4. A correct program stored in the EEPROM unit 200 is read serially into the microcomputer 100 through the serial input pin 54 by using an addressing technique based on data output through the serial output pin 52. The correct program is then stored in a predetermined area of the RAM unit 42. The start address of this predetermined area is specified by the operand of the JMP instruction stored in the JMP-instruction-code ROM unit 120.

In this way, the correct program can be read into the microcomputer 100 even though the microcomputer 100 does not have an external bus. It should be noted that the recording medium for originally storing the correct program does not have to be an EEPROM 200. A recording medium of another type can also be used as well.

Then, the microcomputer 100 can operate correctly. During the operation of the microcomputer 100, the comparison circuit 46 compares address data appearing on the address bus 48 with the contents of the register 44. If both are found equal to each other, the comparison circuit 46 outputs a match signal to the JMP-instruction-code ROM unit 120. In response to the match signal, the JMP-instruction-code ROM unit 120 outputs the code of a JMP instruction stored therein to the data bus 50. At that time, an operation to output data from the ROM unit 40 to the data bus 50 is disabled. Then, the CPU 110 takes in the code of the JMP instruction from the data bus 50, and sets a value indicated by the operand of the JMP instruction in a program counter employed in the CPU 110. In this way, the execution of the JMP instruction will cause the correct program stored in the RAM unit 42 to be executed. In order to return to the program stored in the ROM unit 40 upon completion of the execution of the correct program stored in the RAM unit 42, a branch instruction that changes the contents of the program counter is included as the last instruction at the end of the correct program stored in the RAM unit 42.

By adopting the patch technique described above, at a stage at which an instruction of a portion containing a bug in the program, as shown in FIG. 9(a), stored in the ROM unit 40 is about to be executed, the correct program, as shown in FIG. 9(b), stored in the RAM unit 42 is executed in place of the portion containing the bug.

In some microcomputers 100, by the way, a queue buffer is provided for temporarily storing prefetched instructions which are then supplied to the CPU 110. In such a microcomputer 100, the queue buffer receives data comprising codes of an instruction from the ROM unit 40. As the number of prefetched instructions temporarily stored in the queue buffer exceeds a predetermined value, the operation to prefetch an instruction is halted.

When the comparison circuit 46 outputs the match signal, the queue buffer inputs the code of a JMP instruction from the JMP-instruction-code ROM unit 120. At that time, however, the operation to output data from the ROM unit 40 to the data bus 50 is disabled. That is to say, the ROM unit 40 is disconnected from the data bus 50. The code of the JMP instruction may comprise of a plurality of bytes of data. In the case of such a JMP-instruction code, the operation to prefetch the code of the JMP instruction may be suspended before all the bytes of the code can be read into the queue buffer. In this case, a request is made to sustain the connection between the JMP-instruction-code ROM 120 and the data bus 50 so that the remaining bytes of the code of the JMP instruction can be read into the queue buffer. At that time, however, the CPU 110 may also request to connect the ROM unit 40 to the data bus 50 because the CPU 110 is executing another branch instruction. For example, there may be a situation in which, before all the bytes of the code of a JMP instruction are read into the queue buffer from the JMP-instruction-code ROM unit 120, the microcomputer 100 must execute an interrupt handling routine. In the case of a software interrupt, the interrupt instruction has been read into the queue buffer before the code of a JMP instruction is read from the JMP-instruction-code ROM unit 120. In addition, in the case of a hardware interrupt which occurs at any arbitrary time the CPU 110 is about to execute an instruction, the interrupt handling routine is carried out in place of the execution of the instruction.

As described above, in the microcomputer 100 having a queue buffer, control is disabled by contention between a request to read the code of a JMP instruction from the JMP-instruction-code ROM unit 120 into the queue buffer and an operation such as interrupt handling.

Having the configuration described above, a conventional microcomputer has a problem that control of a mechanism for resolving a problem caused by a bug in a program stored in a ROM unit thereof becomes difficult because a queue buffer is provided for prefetching instructions.

SUMMARY OF THE INVENTION

The present invention is made to overcome the problems described above. It is thus an object of the present invention to provide a microcomputer that can solve a problem caused by a bug in a program stored in a ROM embedded therein with a high degree of reliability even if the microcomputer has a queue buffer.

According to a first aspect of the present invention, the microcomputer has a ROM-output switching unit which is used for:

- enabling an operation to output data from a second ROM for storing instructions for branching to an address space outside the address space of a first ROM and disabling an operation to output data from the first ROM for storing a program when address information stored in an address-information storing unit matches the contents of a program counter of a queue buffer; and
- enabling an operation to output data from the first ROM and disabling an operation to output data from the second ROM when a branch-generation signal or an instruction-code-end signal indicating that an instruction has been output by the second ROM is received.

According to a second aspect of the present invention, the ROM-output switching unit employed in the microcomputer comprises a comparison circuit for comparing address information stored in the address-information storing unit with address data on an address bus and outputting a match signal when the address data matches the address information, and a latch circuit which is put into a set state by the match signal and put into a reset state by the instruction-code-end signal.

According to a third aspect of the present invention, the ROM-output switching unit employed in the microcomputer further comprises:

- a first logic circuit which is used for passing on a ROM-read signal when the latch circuit is put in a reset state;
- a second logic circuit which receives data output from the first ROM and either passes on or blocks the input thereof in accordance with a signal output by the first logic circuit;
- a third logic circuit which is used for passing on a ROM-read signal when the latch circuit is put in a set state; and a fourth logic circuit which receives data output from the second ROM and either passes on or blocks the input thereof in accordance with a signal output by the third logic circuit.

According to a fourth aspect of the present invention, the microcomputer comprises:

- a latch circuit which is put into a set state when the comparison circuit outputs the match signal indicating that address information stored in the address-information storing unit matches the contents of a program counter employed in the CPU, and is put into a reset state by the instruction-code-end signal indicating that the second ROM has output an instruction; and
- a switch circuit which disables an operation to input an instruction from the queue buffer to the CPU and enables an operation to input an instruction from the second ROM to the CPU when the latch circuit is in the set state.

DETAILED DESCRIPTION OF THE PREFERRED EMBODIMENTS

The present invention will become more apparent from the following detailed description of some preferred embodiments with reference to accompanying diagrams showing the embodiments.

First Embodiment

Figure 1:
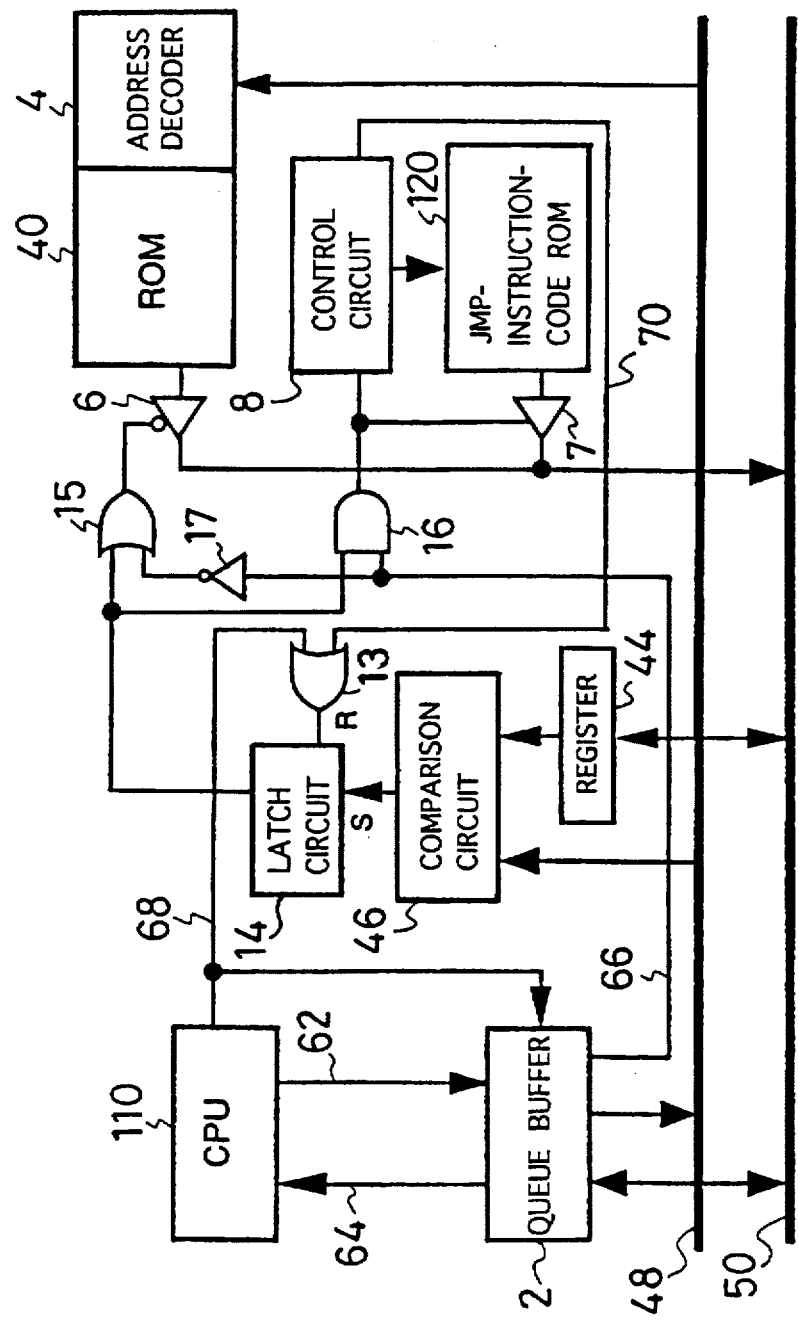
FIG. 1 is a diagram showing the configuration of a microcomputer provided by a first embodiment of the present invention.

FIG. 1 is a diagram showing the configuration of a microcomputer provided by a first embodiment of the present invention. The figure shows a typical single-chip microcomputer. Reference numeral 2 shown in the figure is a queue buffer for temporarily storing prefetched instructions. Reference numeral 4 is an address decoder for decoding data on an address bus denoted by reference numeral 48 and outputting data stored in a ROM unit 40 (a first ROM unit) at an address resulting from the decoding of the data on the address bus. Reference numeral 6 is a three-state buffer for passing on data output by the ROM unit 40 to a data bus 50 when put into a signal-passing state by a control signal set to an L level. Reference numeral 7 is a three-state buffer for passing on data output by a JMP-instruction-code ROM unit 120 (a second ROM unit) to the data bus 50 when put into a signal-passing state by a control signal set to an H level. Reference numeral 8 is a control circuit for controlling an order in which codes of an instruction are to be output from the JMP-instruction-code ROM unit 120. Reference numeral 13 is a logical-sum circuit, referred to hereafter as an OR circuit, for taking the logical sum of a branch-generation signal 68 output by a CPU 110 and a JMP-instruction-code-end signal 70 output by the control circuit 8. Reference numeral 14 is a latch circuit which is put in a set state by a match signal from a comparison circuit 46 and in a reset state by a signal output by the OR circuit 13. Reference numeral 15 is also a logical-sum circuit, or an OR circuit, for taking the logical sum of a signal output by an inverter circuit 17 and a signal output by the latch circuit 14. The signal output by the inverter circuit 17 is the inverted signal of a ROM-read signal 66 output by the queue buffer 2. Reference numeral 16 is a logical-product circuit, referred to hereafter as an AND circuit, for taking the logical product of a signal output by the latch circuit 14 and the ROM-read signal 66 and outputting the logical-product signal to the control circuit 8 and the three-state buffer 7. Reference numeral 44 is a register for storing specific address data. Reference numeral 62 is an address output by the CPU 110 to the queue buffer 2 and reference numeral 64 is data output by the queue buffer 2 to the CPU 110.

It should be noted that, in the case of the microcomputer provided by the first embodiment as described above, the ROM-output switching unit is constituted by the comparison circuit 46, the latch circuit 14, the OR circuit 15, the AND circuit 16, the three-state buffer 6 and the three-state buffer 7. On the other hand, the address-information storing unit is implemented as a register 44. In addition, the first to fourth logic circuits are implemented by the OR circuit 15, the three-state buffer 6, the AND circuit 16 and the three-state buffer 7 respectively.

Figure 2:
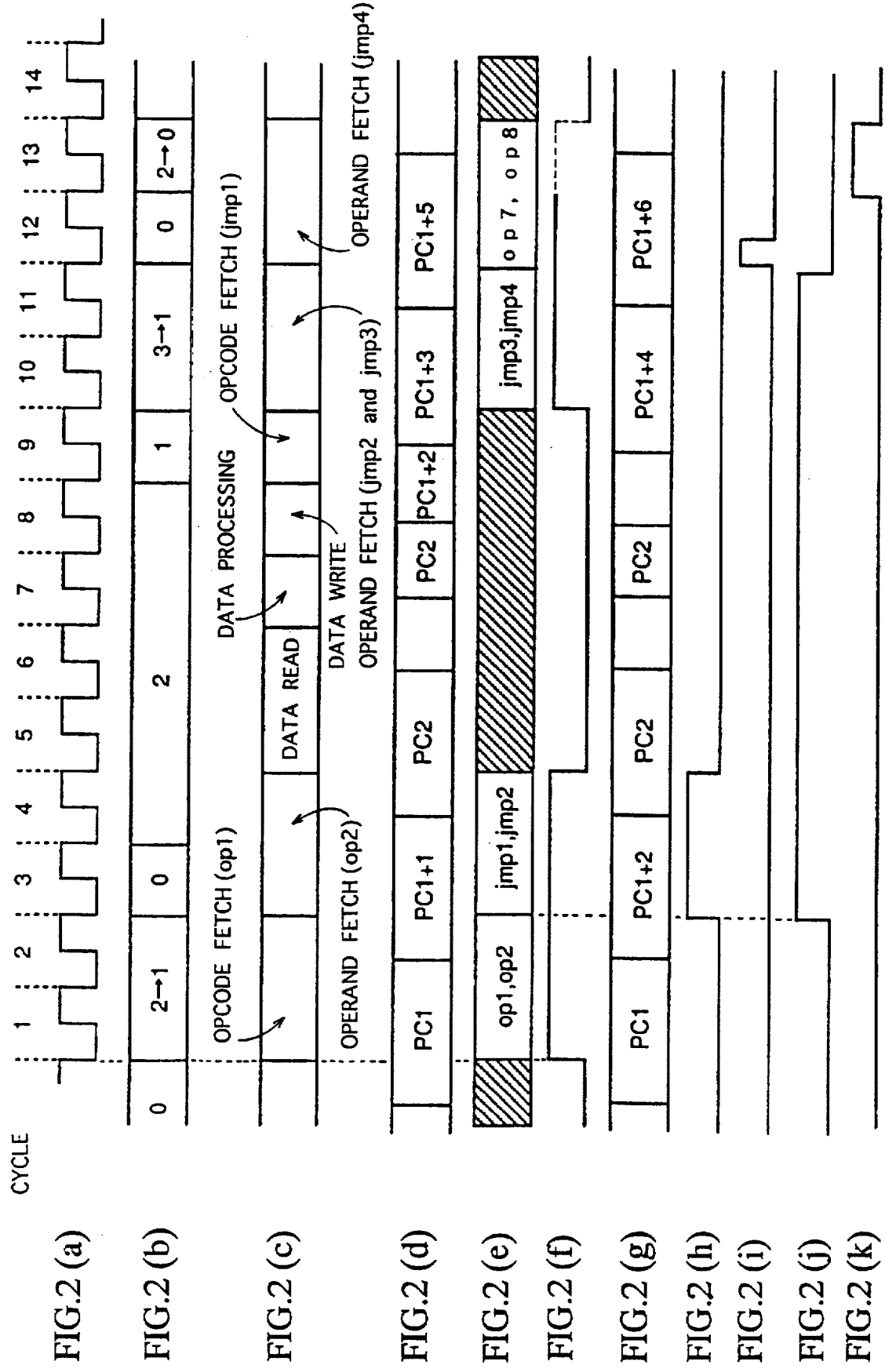
FIGS. 2(a) to 2(k) are timing diagrams used for explaining operations of the microcomputer provided by the first embodiment.

FIG. 2 shows timing diagrams used for explaining operations of the microcomputer provided by the first embodiment. To be more specific, FIG. 2(a) shows a clock signal; FIG. 2(b) shows the number of data stored in the queue buffer 2; FIG. 2(c) shows operations of the CPU 110 wherein an item enclosed in parentheses is data input by the CPU 110 from the queue buffer 2; FIG. 2(d) shows a sequence of addresses output by the CPU 110 to the queue buffer 2 wherein the addresses are each the contents of the program counter in the CPU 110; FIG. 2(e) shows a data input to the queue buffer 2 from the data bus 50; FIG. 2(f) shows the ROM-read signal 66; FIG. 2(g) shows a sequence of addresses output by the queue buffer 2 to the address bus 48 wherein the addresses are each the contents of the program counter in the queue buffer 2; FIG. 2(h) shows the match signal output by the comparison circuit 46; FIG. 2(i) shows the JMP-instruction-code-end signal 70; FIG. 2(j) shows the signal output by the latch circuit 14; and FIG. 2(k) shows the branch-generation signal 68.

The operations of the microcomputer are explained as follows.

An address is output to the address bus 48 by the queue buffer 2. When the number of data stored in the queue buffer 2 becomes 1 or 0 byte, the queue buffer reads codes of an instruction out from the ROM unit 40. Codes of an instruction are read out from the ROM unit 40 in two-byte units. It should be noted that, if an access to memory is required during execution of an instruction, the CPU 110 directly makes an access to an address in the memory.

Figure 8:
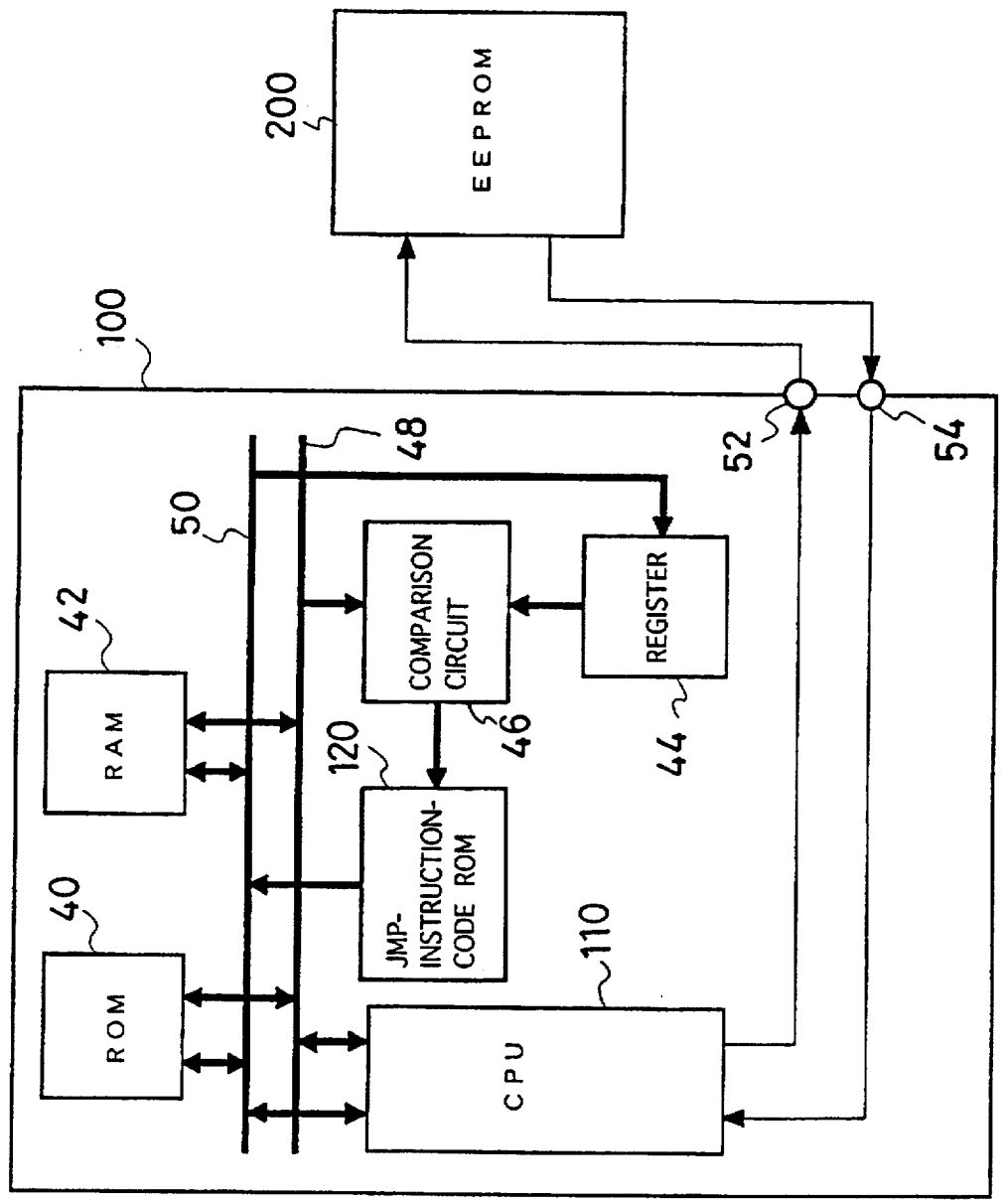
FIG. 8 is a block diagram showing the configuration of a conventional single-chip microcomputer.
Figure 9:
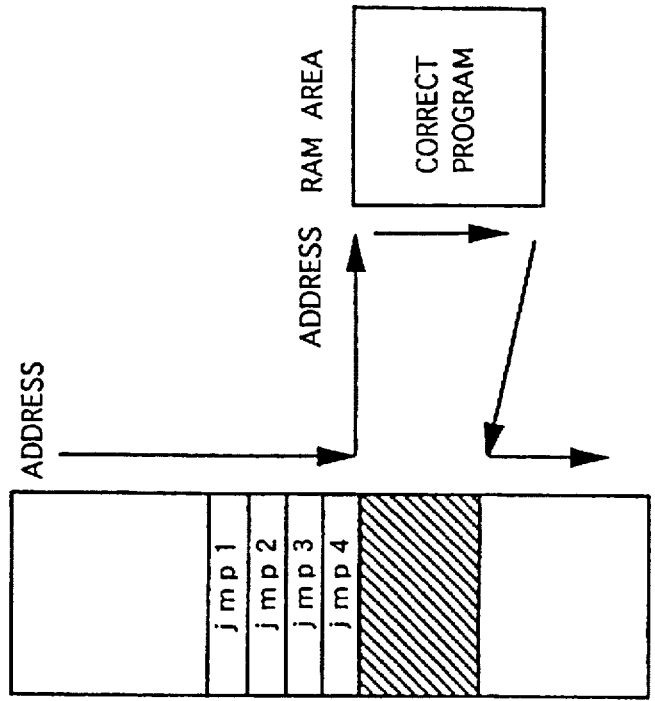
FIGS. 9(a) and 9(b) are diagrams showing a procedure for coping with a condition in which a bug is found in a program stored in a ROM.
Figure 9:
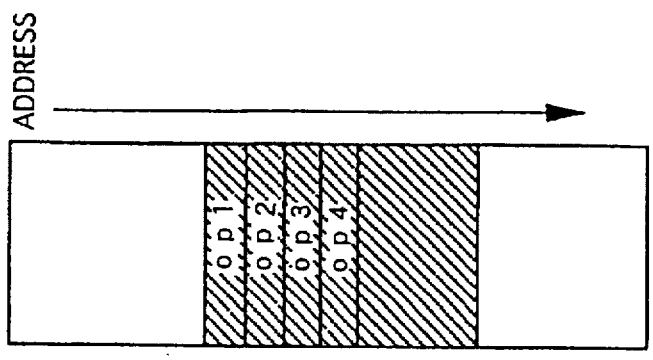

In the process of manufacturing the microcomputer, a predetermined program is written into the ROM unit 40. In addition, a JMP instruction to branch to the start address of a specific area in a RAM unit, which is not shown in the figure, is written into the JMP-instruction-code ROM unit 120. It should be noted that the JMP instruction is constituted by data of four bytes. The specific area is an area in the RAM unit which is made available for use by the user to write a correct program serving as a substitute for a portion of the predetermined program containing a bug. When a bug is found in the program stored in the ROM unit 40, the user sets the start address of a portion of the program containing the bug in the register 44 and writes the correct program into the specific region of the RAM unit by means of a mechanism typically using the EEPROM unit 200 shown in FIG. 8. That is to say, the address PC1+2 is the start address of the portion of the program containing the bug.

Next, the operation of the microcomputer in a condition that the start address of a portion of the program containing the bug is set in the register 44 and the correct program is written in the specific region of the RAM unit is explained.

Let the queue buffer 2 be in an initial state before entering cycle #1 shown in FIG. 2. That is to say, the number of data stored in the queue buffer 2 is zero, and the address data 62 is set in the program counter of the queue buffer 2. In a case where the CPU 110 requests the queue buffer 2 to supply data at an address PC1, the queue buffer 2 sets the address PC1 in the program counter thereof. The address PC1 is then output to address bus 48 and, at the same time, the ROM-read signal 66 is set to the H level being the active level thereof. Let the initial output state of the latch circuit 14 be in the reset state. That is to say, the output of the latch circuit 14 is set initially at the L level. In this state, since the inputs to the OR circuit 15 are both set at the L level, the three-state buffer 6 is put in a signal-passing state. The address decoder 4 decodes the address PC1 on the address bus 48, requesting the ROM unit 40 to output the code of an instruction stored at the address PC1. Since the three-state buffer 6 is put in a signal passing state, the code of the instruction is output to the data bus 50. The queue buffer 2 inputs the code of the instruction from the data bus 50. Since the code of an instruction is read out in two-byte units, the ROM unit 40 outputs two bytes of data op1 and op2 stored in the addresses PC1 and PC1+1 respectively. The queue buffer 2 inputs the two bytes of data op1 and op2 through the data bus 50. As a result, the number of data stored in the queue buffer 2 becomes 2 in cycle #1 as shown in FIG. 2(b).

Since the CPU 110 made a request for an instruction stored at the address PC1, the queue buffer 2 outputs the data op1 to the CPU 110. As the data op1 is output to the CPU 110, the number of data stored in the queue buffer 2 becomes 1 in cycle #2 as shown in FIG. 2(b), causing the queue buffer 2 to prefetch another instruction from the ROM unit 40. Namely, in order to prefetch the other instruction from the ROM unit 40, an address PC1+2 is output to the address bus 48 and the ROM-read signal 66 is set at the active H level. On the other hand, recognizing that the data op1 is the opcode of an instruction in cycle #2 as shown in FIG. 2(c), the CPU 110 requests the queue buffer 2 to supply the data stored at the address PC1+1 (that is, the operand of the instruction) while the queue buffer 2 is prefetching the other instruction in the ROM unit 40 (cycles #2 to #4 in FIG. 2(d)). In response to the request made by the CPU 110, the queue buffer 2 outputs the data op2 held therein to the CPU 110.

As a result, the number of data stored in the queue buffer 2 becomes zero in cycle #3 as shown in FIG. 2(b).

In cycles #5 to #8, the CPU 110 carries out processing in accordance with the instruction comprising the data op1 and op2. In typical processing shown in FIG. 2(c), data is read out from an address PC2, processed by the CPU 110 and a result of the processing is written into the address PC2. In the course of the processing, the CPU 110 makes accesses to the address PC2 in the cycles #4 to #8 as shown in FIG. 2(d). It should be noted that hatched time segments shown in FIG. 2(e) are periods in which the data bus 50 is used for transferring data other than the code of an instruction.

In this example, the address PC1+2 is set in the register 44 as the start address of the portion of containing a bug. Therefore, when the queue buffer 2 outputs the address PC1+2 to the address bus 48, the comparison circuit 46 sets the match signal to the H level as shown in FIG. 2(h). As a result thereof, a signal output by the latch circuit 14 is set to the H level as shown in FIG. 2(j). The H-level signal output by the latch circuit 14, in turn, raises a signal output by the OR circuit 15 to the H level, putting the three-state buffer 6 in a blocking state. As a result, data output from the ROM unit 40 is not passed on to the data bus 50. Since the signal output by the latch circuit 14 is supplied to the AND circuit 16 as one of the inputs thereof, the AND circuit 16 is put in a state of passing on the ROM-read signal 66. Since the queue buffer 2 sets the ROM-read signal 66 to the H level, the AND circuit 16 also outputs a signal at the H level. As a result, the three-state buffer 7 is put in a signal passing state. When the signal output by the AND circuit 16 is set at the H level, the control circuit 8 is activated, requesting the JMP-instruction-code ROM unit 120 to output a JMP instruction constructed in a correct order.

First of all, the first two bytes of data jmp1 and jmp2 of the JMP instruction code are output sequentially one after another synchronously with a clock signal from the JMP-instruction-code ROM unit 120. The data jmp1 and jmp2 are supplied to the queue buffer 2 through the data bus 50 in cycles #3 and #4 as shown in FIG. 2(e). Since the number of data stored in the queue buffer 2 becomes two in cycle #4 as shown in FIG. 2(b), the queue buffer 2 suspends the operation to prefetch an instruction from the ROM unit 40.

As the execution of the instruction code comprised of the data op1 and op2 is completed, the CPU 110 requests the queue buffer 2 to supply the code of an instruction at the next address PC1+2 following PC1+1. In response to the request made by the CPU 110, the queue buffer 2 outputs the data jmp1 stored therein to the CPU 110. As a result thereof, since the number of data stored in the queue buffer 2 becomes one, the queue buffer 2 resumes the operation to prefetch an instruction from the ROM unit 40. Namely, the queue buffer 2 outputs an address PC1+4 to the address bus 48 and, at the same time, sets the ROM-read signal 66 to the H level in cycles #9 to #11 as shown in FIGS. 2(f) to 2(g). As the ROM-read signal 66 is set to the H level, the later two bytes of data jmp3 and jmp4 of the JMP instruction code are output by the JMP-instruction-code ROM unit 120. The two bytes of data jmp3 and jmp4 are supplied to the queue buffer 2 through the data bus 50 in cycles #10 and #11 as shown in FIG. 2(e).

On the other hand, the CPU 110 recognizes that the data jmp1 is the opcode of the JMP instruction, the CPU 110 requests the queue buffer 2 to supply data at the address PC1+3 in cycles #9 to #11 as shown in FIG. 2(d) in order to obtain the operand of the JMP instruction. In response to the request made by the CPU 110, the queue buffer 2 transfers the data jmp2 and jmp3 stored therein to the CPU 110 in cycles #10 and #11 as shown in FIG. 2(c). As a result thereof, the number of data in the queue buffer 2 becomes 1. It should be noted that the number of data stored in the queue buffer 2 was increased by two from one to three previously when the two bytes of data jmp3 and jmp4 were supplied to the queue buffer 2 in cycle #10 as shown in FIG. 2(b). Since the JMP instruction is comprised of four bytes, the CPU 110 outputs an address PC1+5 as the address data 62 in order to obtain the remaining byte. In response to this request made by the CPU 110, the queue buffer 2 transfers the data jmp4 stored therein. As a result thereof, the number of data stored in the queue buffer 2 becomes zero.

At a point of time the operation to output the JMP instruction from the JMP-instruction-code ROM unit 120 is completed, the control circuit 8 raises the JMP-instruction-code-end signal 70 to the H level as shown in FIG. 2(i). The latch circuit 14 is put in a reset state, as shown in FIG. 2(j), by the rise of the JMP-instruction-code-end signal 70 supplied to the latch circuit 14 through the OR circuit 13. Namely, the latch circuit 14 outputs a signal at the L level, the OR circuit 15 is put in a state of passing on the ROM-read signal 66. Thus, later on, when the ROM-read signal 66 is set to the H level, data output by the ROM unit 40 is supplied to the queue buffer 2 through the data bus 50. Since one of the inputs of the AND circuit 16, to which the signal output by the latch circuit 14 is supplied, is set to the L level, a signal output by the AND circuit 16 is set to the L level. As a result thereof, the three-state buffer 7 is put in a signal blocking state. That is to say, data from the JMP-instruction-code ROM unit 120 is not output to the data bus 50.

In order to prefetch a next instruction, the queue buffer 2 outputs an address PC1+6 to the address bus 48 in cycle #11 and sets the ROM-read signal 66 to the H level (cycles #11 to #13 in FIGS. 2(f) and 2(g)). At this point of time, since the three-state buffer 6 has been put in a signal passing state, data op7 and op8 stored at the addresses PC1+6 and PC1+7 are output to the data bus 50 from the ROM unit 40 in response to the ROM-read signal 66 set to the H level. The queue buffer 2 then receives the data op7 and op8 from the data bus 50.

However, the branch-generation signal 68 is output from the CPU 110 upon completion of the execution of the JMP instruction as shown in FIG. 2(k), the contents of the queue buffer 2 are cleared by the branch-generation signal 68. As a result thereof, the data op7 and op8 are deleted from the queue buffer 2, reducing the number of data stored in the queue buffer 2 to zero. Further, when the CPU 110 requests an instruction later on, the value of the address data 62 is stored is set in the program counter of the queue buffer 2. It should be noted that the program counter in the CPU 110 is updated to a value indicated by the operand of the code of the JMP instruction.

As described above, only when the JMP-instruction-code ROM unit 120 is requested to output the code of a JMP instruction for branching to the correct program to the data bus 50, the three-state buffer 7, which takes data from the JMP-instruction-code ROM unit 120 as input, is put in a signal passing state and the three-state buffer 6 is put in a signal blocking state. Then, as the CPU 110 executes the JMP instruction (jmp1 to jmp4) for branching to the correct program, the three-state buffer 6, which takes data from the ROM unit 40 as input, is put back in a signal passing state while the three-state buffer 7 is put in a signal blocking state. Thereafter, the correct program stored in the RAM unit is executed. A branch instruction located at the end of the correct program causes the CPU 110 to return to the execution of the program stored in the ROM unit 40. At that time, since the three-state buffer 6, which takes data from the ROM unit 40 as input, has been put in a signal passing state, the execution of the program stored in the ROM unit 40 is resumed immediately.

Figure 3:
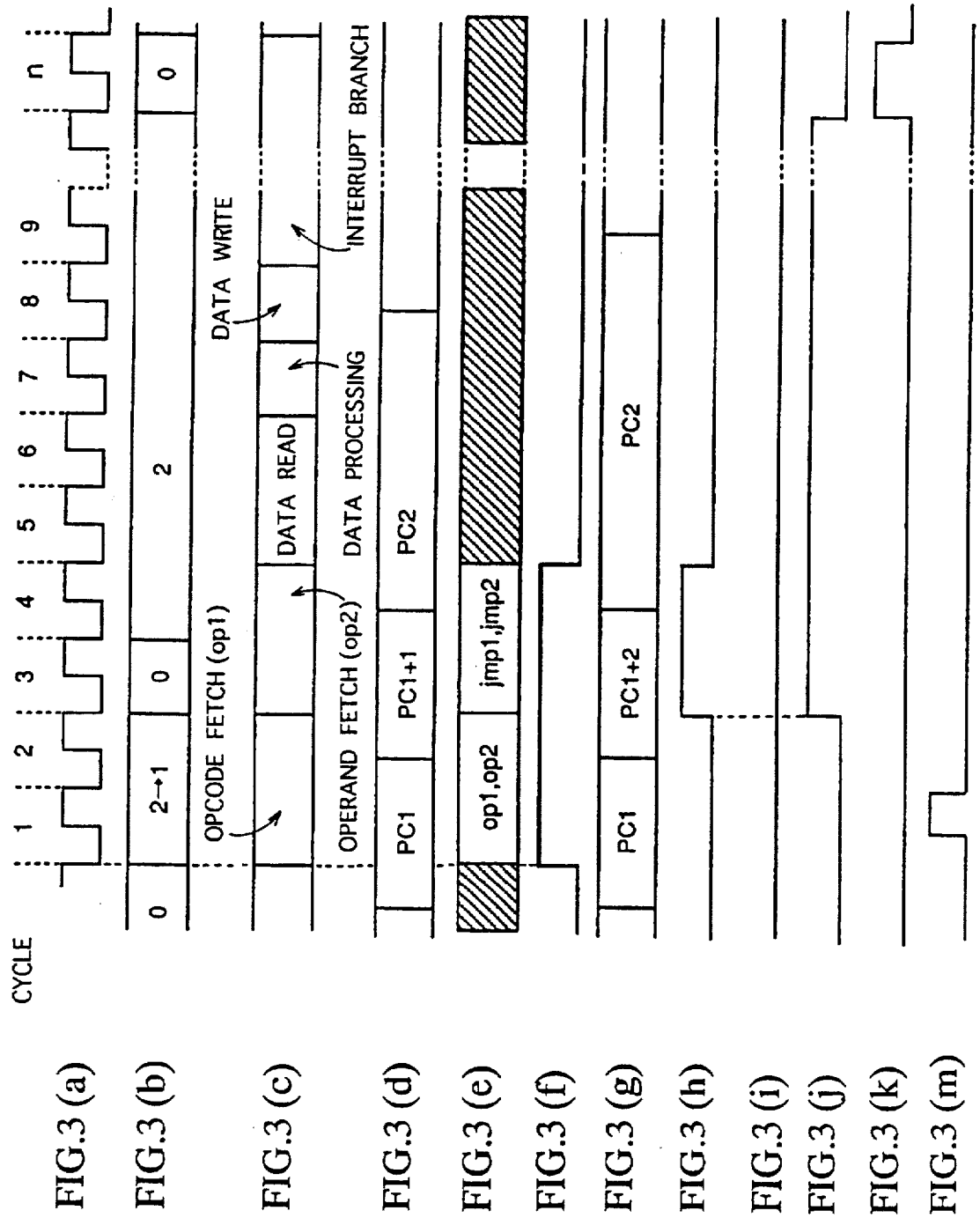
FIGS. 3(a) to 3(m) are timing diagrams used for explaining other operations of the microcomputer provided by the first embodiment.

With reference to timing charts shown in FIG. 3, the following description explains a hardware interrupt which occurs before the operation to output the code of the JMP instruction from the JMP-instruction-code ROM unit 120 is completed. Let an address PC1+2 be stored in the register 44 as the start address of a specific area in the RAM unit. As shown in FIG. 3(m), let a request for an interrupt be made in cycle #1. At that time, since the CPU 110 is executing an instruction, the request for an interrupt is accepted after the execution of the instruction. Therefore, the microcomputer carries out processing in cycles #1 to #8 shown in FIG. 3 as if no request for an interrupt had been made. In other words, the processing carried out by the microprocessor in cycles #1 to #8 shown in FIG. 3 is the same as the processing carried out in cycles #1 to #8 shown in FIG. 2. It should be noted that the timing charts shown in FIGS. 3(a) to 3(k) correspond to the timing charts shown in FIGS. 2(a) to 2(k) respectively. At the end of cycle #8, the contents of the program counter in the CPU 110 are PC1+2 as shown in FIG. 3(d).

In order to prefetch an instruction, the queue buffer 2 outputs the address PC1+2 to the address bus 48 in cycles #2 to #4 as shown in FIG. 3(g). As a result thereof, the comparison circuit 46 sets the match signal to the H level which puts the latch circuit 14 in a set state. In this state, the signal output by the latch circuit 14 is set at the H level, putting the OR circuit 15 in a state of blocking the ROM-read signal 66. In other words, the operation to output data from the ROM unit 40 to the data bus 50 is disabled. On the other hand, the AND circuit 16 is put in a state of passing on the ROM-read signal 66. In this state, the data jmp1 and jmp2 are output from the JMP-instruction-code ROM unit 120 to the data bus 50 in accordance with the ROM-read signal 66 set to the H level. The queue buffer 2 takes in the data jmp1 and jmp2 from the data bus 50 in cycles #3 and #4 as shown in FIG. 3(e), increasing the number of data stored in the queue buffer to two. Thus, the queue buffer 2 suspends the operation to prefetch the instruction. As a result thereof, the data jmp1 and jmp2 constituting a portion of the JMP instruction code are stored in the queue buffer 2 in cycle #8. In addition, at this point of time, the latch circuit 14 is put in a set state.

Since the request for an interrupt has been made, at the end of cycle #8 at which the execution of the instruction is completed, the CPU 110 starts a branch for the interrupt. It takes several cycles to execute the branch. In the last cycle of the branch, the CPU 110 sets the branch-generation signal 68 to the H level as shown in FIG. 3(k). The branch-generation signal 68 is supplied to the latch circuit 14 through the OR circuit 13, putting the latch circuit 14 in a reset state. As a result thereof, the OR circuit 15 is put in a state of passing on the ROM-read signal 66. That is to say, the operation to output data from the ROM unit 40 to the data bus 50 is enabled. On the other hand, the AND circuit 16 is put in a state of blocking the ROM-read signal 66. In addition, the branch-generation signal 68 clears the contents of the queue buffer 2.

An interrupt handling program to be executed after the branch for the interrupt is also stored in the ROM unit 40. The operation to output data from the ROM unit 40 to the data bus 50 has been restored to an enabled state prior to the start of the execution of the interrupt handling program by the processing described above. In addition, since the contents of the queue buffer 2 have been cleared, the queue buffer 2 sets the start address of the interrupt handling program in the program counter thereof when the CPU 110 requests the queue buffer 2 to supply data of the start address of the interrupt handling program.

If the processing described above to put the latch circuit 14 in a reset state by means of the branch-generation signal 68 had not been carried out, the operation to output data from the ROM unit 40 to the data bus 50 would be disabled while the operation to output data from the JMP-instruction-code ROM unit 120 to the data bus 50 would be enabled as they are. In this case, the instruction jmp3 and jmp4, which would be read out from the JMP-instruction-code ROM unit 120, are transferred to the CPU 110 through the queue buffer 2 at the beginning of the interrupt handing program to be executed after the interrupt branch. As a result thereof, the interrupt handling program would not be executed normally. In the case of the first embodiment, however, those things will never happen.

As the execution of the interrupt handling program is completed, the contents of the program counter in the CPU 110 are restored to its original state, that is, to the address PC1+2. Thus, the CPU 110 requests the address PC1+2 as the address data 62. In general, since a branch instruction is executed at the end of the interrupt handling program, the contents of the queue buffer 2 have been cleared. Therefore, in response to the request made by the CPU 110 to supply an instruction stored at the address PC1+2, the queue buffer 2 sets the address PC1+2 in the program counter thereof, outputting the address PC1+2 to the address bus. As the address PC1+2 appears on the address bus, the comparison circuit 46 sets the match signal to the H level, causing the JMP-instruction-code ROM unit 120 to output the code of a JMP instruction to the data bus 50 again. In this way, the correct program can be executed.

As described above, in a microcomputer having a queue buffer 2 for prefetching instructions according to the first embodiment, an interrupt handling program can be executed normally even if the request for the interrupt is made while the queue buffer 2 is reading out the code of a JMP instruction from a JMP-instruction-code ROM unit 120. Namely, in such a case, the operation to read out the code of a JMP instruction from the JMP-instruction-code ROM unit 120 is suspended. Instead, codes of instructions are read out sequentially one after another starting with the one at the start address of the interrupt handling program from a ROM unit 40 and supplied to the queue buffer 2.

It should be noted that the queue buffer 2 may output the address PC1+2 to the address bus 48 while the CPU 110 is executing a branch instruction of the program. In this case, the comparison circuit 46 outputs the match signal at the H level, putting the latch circuit 14 in a set state. As a result thereof, the operation to output data from the ROM unit 40 to the data bus 50 is disabled. Under this condition, the state of disabling the operation to output data from the ROM unit 40 to the data bus 50 is sustained so that the transfer of control to a destination program in accordance with the branch instruction can not be accomplished. According to the first embodiment, however, at the end of the execution of the branch instruction, the latch circuit 14 is reset by the branch-generation signal 68. As a result thereof, there is no case in which a transfer of control to a destination program in accordance with the branch instruction can not be accomplished.

Second Embodiment

Figure 4:
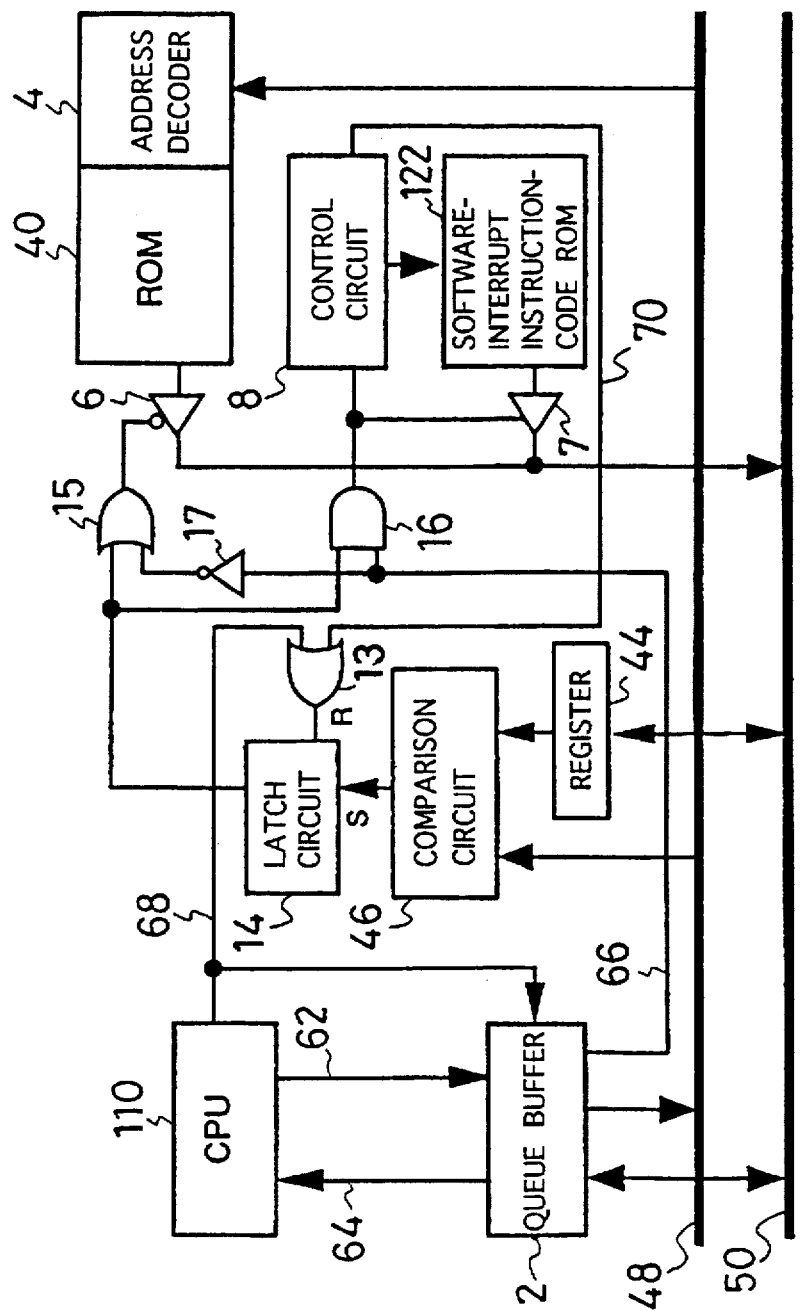
FIG. 4 is a diagram showing the configuration of a microcomputer provided by a second embodiment of the present invention.

FIG. 4 is a block diagram showing the configuration of a microcomputer provided by the second embodiment of the present invention. Reference numeral 122 shown in the figure is a software-interrupt instruction-code ROM unit (a second ROM unit) provided in the microcomputer in place of the JMP-instruction-code ROM unit 120 shown in FIG. 1. The remaining components of the configuration are the same as those shown in FIG. 1.

Operations carried out by the microcomputer are explained as follows.

In the software-interrupt instruction-code ROM unit 122, a software-interrupt instruction, that is, an instruction to branch to a start address of a specific area in the RAM unit is stored in advance. The software-interrupt instruction comprises a plurality of bytes. When the comparison circuit 46 outputs the match signal at the H level, much like the first embodiment, the operation to output data from the ROM unit 40 to the data bus 50 is disabled while the operation to output data from the software-interrupt instruction-code ROM unit 122 to the data bus 50 is enabled. As a result thereof, when the ROM-read signal 66 is set at the H level, the code of the software-interrupt instruction is output from the software-interrupt instruction-code ROM unit 122 to the data bus 50. As the operation to output the code of the software-interrupt instruction is completed, the control circuit 8 sets the JMP-instruction-code end signal 70 to the H level. The other operations are the same as those in the first embodiment.

As described above, in the case of the second embodiment, the CPU 110 executes a software-interrupt instruction instead of executing the JMP instruction stored in the JMP-instruction-code ROM unit 120 thereby to give the same effect as that of the first embodiment. That is to say, only when the software-interrupt instruction-code ROM unit 122 is requested to output the code of the software-interrupt instruction for branching to the correct program to the data bus 50, the three-state buffer 7, which takes data from the software-interrupt instruction-code ROM unit 122 as input, is put in a signal passing state and the three-state buffer 6 is put in a signal blocking state. Then, as the CPU 110 executes the software-interrupt instruction for branching to the correct program, the three-state buffer 6, which takes data from the ROM unit 40 as input, is put back in a signal passing state while the three-state buffer 7 is restored in a signal blocking state.

In addition, an interrupt handling program can be executed normally even if the request for the interrupt is made while the queue buffer 2 is reading out the code of the software-interrupt instruction from the software-interrupt instruction-code ROM unit 122. This is because, in the event of such a request for an interrupt, the operation to read out the code of the software-interrupt instruction from the software-interrupt instruction-code ROM unit 122 is suspended. Instead, codes of instructions are read out sequentially one after another starting with the one at the start address of the interrupt handling program from the ROM unit 40 and supplied to the queue buffer 2.

Third Embodiment

Figure 5:
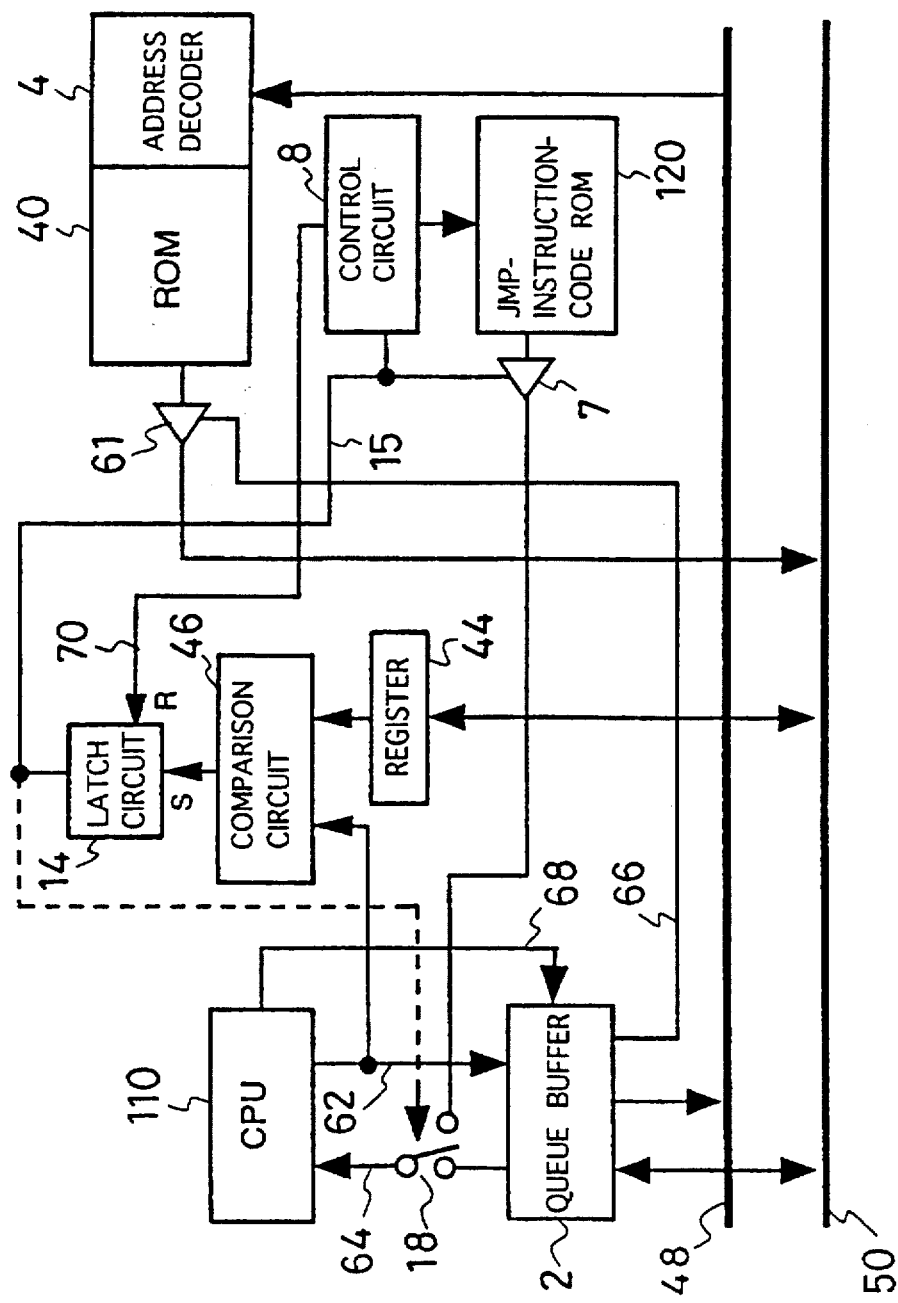
FIG. 5 is a diagram showing the configuration of a microcomputer provided by a third embodiment of the present invention.

FIG. 5 is a block diagram showing the configuration of a microcomputer provided by a third embodiment of the present invention. Also in this case, a single-chip microcomputer is taken as an example. Reference numeral 18 shown in the figure denotes a switch circuit for selecting either the queue buffer 2 or the JMP-instruction-code ROM unit 120 as a source from which data is to be supplied to the CPU 110. Reference numeral 61 is a three-state buffer which enters a signal passing state when the ROM-read signal 66 is set to the H level, passing on data output from the ROM unit 40 to the data bus 50. The remaining components of the configuration are the same as those shown in FIG. 1. In the case of the third embodiment, however, the comparison circuit 46 compares the contents of the register 44 with the address data 62 output by the CPU 110. In addition, the latch circuit 14 is put in a reset state only by the JMP-instruction-code end signal 70. The signal output by the latch circuit 14 is directly supplied to the three-state buffer 7 and the control circuit 8. The switch circuit 18 is switched over to a state of supplying the output of the queue buffer 2 to the CPU 110 when the signal output by the latch circuit 14 is reset to the L level.

Figure 6:
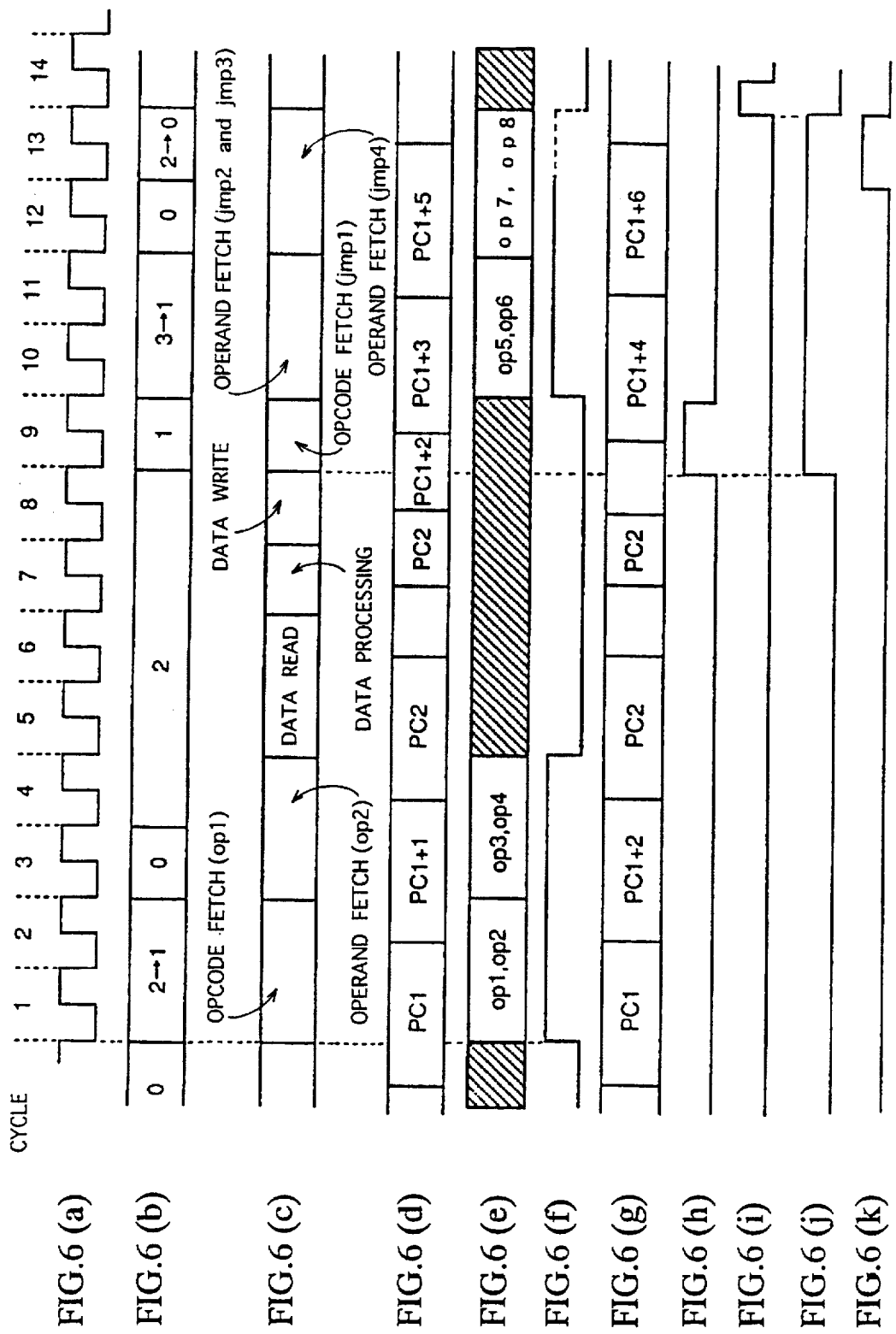
FIGS. 6(a) to 6(k) are timing diagrams used for explaining operations of the microcomputer provided by the third embodiment.

FIG. 6 shows timing charts used for explaining operations of the microcomputer provided by the third embodiment. FIGS. 6(a) to 6(k) showing operations of the components constituting the microprocessor correspond to FIGS. 2(a) to 2(k) respectively. It should be noted that an item enclosed in parentheses of FIG. 6(c) is data input to the CPU 110 from either the queue buffer 2 or the JMP-instruction-code ROM unit 120.

Next, operations of the microcomputer are explained.

Let an address PC1+2 be set in the register 44. Also assume that, before entering cycle #1 shown in FIG. 6, the queue buffer 2 is in an initial state. In addition, let the signal output by the latch circuit 14 be reset at the L level and the CPU 110 be put in a state of inputting data from the queue buffer 2. Then, in cycle #1, the CPU 110 requests the queue buffer 2 to supply data stored at an address PC1 thereto as shown in FIG. 6(d). In response to the request made by the CPU 110, the queue buffer 2 outputs the address PC1 to the address bus 48 and, at the same time, sets the ROM-read signal 66 to the H level being the active level thereof. Since the signal output by the latch circuit 14 is reset at the L level, the three-state buffer 7 is put in a signal blocking state. The address decoder 4 decodes the address PC1 on the address bus 48, causing the ROM unit 40 to output the code of an instruction stored therein at the decoded address. Since the three-state buffer 61 is put in a signal passing state by the ROM-read signal 66 set at the H level, the code of the instruction is output to the data bus 50. The queue buffer 2 then inputs the code of the instruction from the data bus 50. The code of an instruction is read in two-byte units. Therefore, the ROM unit 40 outputs two bytes of data op1 and op2 which are then received by the queue buffer 2 in cycles #1 and #2 as shown in FIG. 6(e). As the two bytes of data op1 and op2 are supplied to the queue buffer 2, the number of bytes of data stored in the queue buffer 2 becomes two in cycles #1 and #2 as shown in FIG. 6(b).

Since a request for the address PC1 was made by the CPU 110, the queue buffer 2 outputs the data op1 to the CPU 110. Thus, the number of data stored in the queue buffer 2 becomes one in cycle #2 as shown in FIG. 6(b). Since the number of data stored in the queue buffer 2 has become one, the queue buffer 2 executes an operation to prefetch an instruction. To be more specific, the queue buffer 2 outputs an address PC1+2 on the address bus 48 and, at the same time, sets the ROM-read signal 66 to the H level. On the other hand, recognizing that the data op1 is the opcode of an instruction in cycle #2 as shown in FIG. 6(c), the CPU 110 requests the queue buffer 2 to supply data at the address PC1+1 storing the operand in cycles #2 to #4 as shown in FIG. 6(d) while the queue buffer 2 is prefetching the next instruction. In response to the request made by the CPU 110, the queue buffer 2 outputs the data op2 stored therein to the CPU 110. As a result thereof, the number of data stored in the queue buffer 2 becomes zero in cycle #3 as shown in FIG. 6(b). Thereafter, the CPU 110 carries out processing based on the instruction comprising the data op1 and op2 in cycles #5 to #8.

As described above, since the queue buffer 2 outputs an address PC1+2 on the address bus 48 and, at the same time, sets the ROM-read signal 66 to the H level, the data op3 and op4 stored at the corresponding address are output by the ROM unit 40 to the data bus 50. The queue buffer 2 then inputs the data op3 and op4 from the data bus 50 in cycles #3 and #4 as shown in FIG. 6(e). As a result thereof, the number of data stored in the queue buffer 2 becomes two in cycle #4 as shown in FIG. 6(b). Since the number of data stored in the queue buffer 2 has become two, the queue buffer 2 suspends the operation to prefetch an instruction. It should be noted that, even though the address PC1+2 is set in the address register 44, the match signal is not set to the H level at this point of time because data on the address bus 48 is not supplied to the comparison circuit 46.

After completing the execution of the instruction comprising the data op1 and op2, the CPU 110 requests the queue buffer 2 to supply the code of an instruction stored at an address PC1+2 next to the address PC1+1 in cycles #8 and #9 as shown in FIG. 6(d). Since the address PC1+2 is also supplied to the comparison circuit 46 as one of the inputs thereof, the comparison circuit 46 outputs the match signal set to the H level as shown in FIG. 6(h). As a result thereof, the latch circuit 14 is put in a set state in cycle #9 as shown in FIG. 6(j). Since the latch circuit 14 sets the signal output thereby to the H level, the three-state buffer 7 is put in a signal passing state. At the same time, the switch circuit 18 connects the CPU 110 to the three-state buffer 7.

When the signal output by the latch circuit 14 is set at the H level, the control circuit 8 is activated, requesting the JMP-instruction-code ROM unit 120 to output a JMP instruction constructed in a correct order. In response to the request made by the control circuit 8, first of all, the JMP-instruction-code ROM unit 120 outputs the data jmp1 being the first byte of the code of the instruction. The data jmp1 is supplied to the CPU 110 through the three-state buffer 7 and the switch circuit 18 in cycle #9 as shown in FIG. 6(c).

On the other hand, receiving the request made by the CPU 110 for the code of the instruction stored at the address PC1+2, the queue buffer 2 outputs the data op3 stored therein to the CPU 110. Since the switch circuit 18 disconnects the CPU 110 from the queue buffer 2, however, the data op3 can not be supplied to the CPU 110. Since the queue buffer 2 has output one byte of data to the CPU 110, the number of data stored in the queue buffer 2 is decreased to one in cycle #9 as shown in FIG. 6(b). Therefore, the queue buffer 2 resumes the operation to prefetch an instruction. Accordingly, data op5 and op6 stored at addresses PC1+4 and PC1+5 respectively are output from the ROM unit 40 to the queue buffer 2 through the data bus 50 (cycles #9 to #11 of FIG. 6(g) and cycles #10 and #11 of FIG. 6(e)). As a result thereof, the number of data stored in the queue buffer 2 is increased to three in cycle #10 as shown in FIG. 6(b).

Recognizing that the data jmp1 is the opcode of the JMP instruction, the CPU 110 requests the queue buffer 2 to supply data at the address PC1+3 in cycles #9 to #101 as shown in FIG. 6(d) in order to obtain the operand of the JMP instruction. In response to the request made by the CPU 110, the queue buffer 2 outputs the data op4 and op5 stored therein to the CPU 110. Since the switch circuit 18 disconnects the CPU 110 from the queue buffer 2, however, the data op4 and op5 can not be supplied to the CPU 110. None the less, the number of data stored in the queue buffer 2 is decreased to one in cycle #11 as shown in FIG. 6(b). In order to request the remaining one byte of the code of the JMP instruction, the CPU 110 outputs an address PC1+5 as the address data 62. In response to the request made by the CPU 110, the queue buffer 2 transfers the data op6 held thereby to the CPU 110. Since the switch circuit 18 disconnects the CPU 110 from the queue buffer 2, however, the data op6 can not be supplied to the CPU 110 as well. None the less, the number of data stored in the queue buffer 2 is decreased to zero in cycle #12 as shown in FIG. 6(b).

In the mean time, the data jmp2 to jmp4 are input to the CPU 110 through the three-state buffer 7 and the switch circuit 18. As a result thereof, the contents of the program counter in the CPU 110 are set at a value determined by the operand of the JMP instruction. In addition, the CPU 110 outputs the branch-generation signal 68 as shown in FIG. 6(k). At the point of time the operation to output the code of the JMP instruction from the JMP-instruction-code ROM unit 120 is completed, the control circuit 8 sets the JMP-instruction-end signal 70 to the H level as shown in FIG. 6(i). The latch circuit 14 is put in a reset state on the rising edge of the JMP-instruction-end signal 70. Namely, the signal output by the latch circuit 14 is set to the L level in cycle #14 as shown in FIG. 6(j). As a result thereof, the three-state buffer 7 is put in a signal blocking state and, at the same time, the switch circuit 18 disconnects the JMP-instruction-code ROM unit 120 from the CPU 110 but connects the queue buffer 2 to the CPU 110 instead.

In order to prefetch the code of an instruction, the queue buffer 2 outputs an address PC1+6 to the address bus 48 in cycle #11 and, at the same time, sets the ROM-read signal 66 to the H level (cycles #11 to #13 as shown in FIGS. 6(f) and 6(g)). As the ROM-read signal 66 is set to the H level, the ROM unit 40 outputs data op7 and op8 stored at addresses PC1+6 and PC1+7 respectively to the data bus 50. The queue buffer 2 then takes in the data op7 and op8 from the data bus 50.

Since the contents of the queue buffer 2 are cleared by the branch-generation signal 68, however, the microcomputer is in a state of being ready to execute a program at the destination of the JMP instruction as is the case with the first embodiment.

Figure 7:
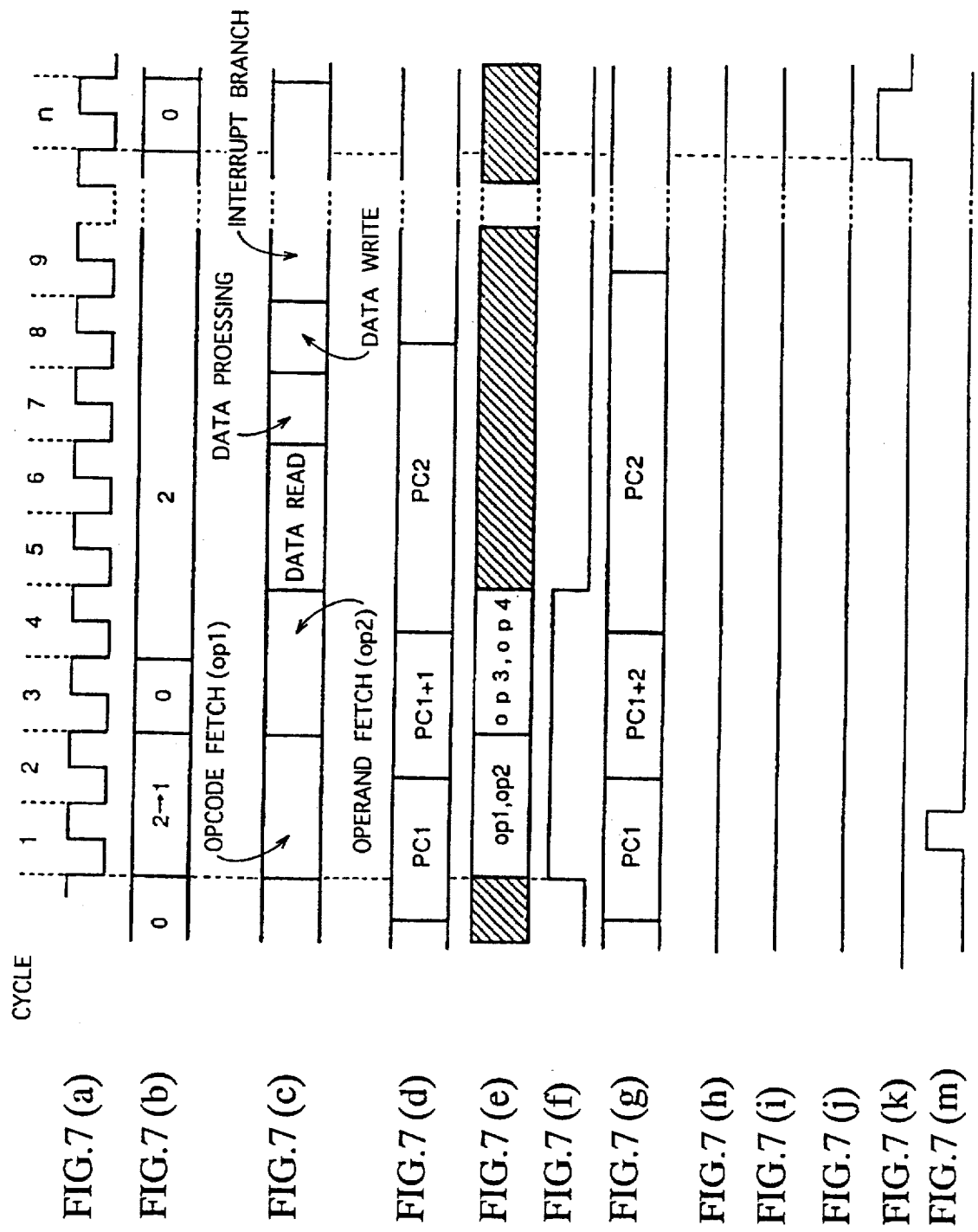
FIGS. 7(a) to 7(m) are timing diagrams used for explaining other operations of the microcomputer provided by the third embodiment.

With reference to timing charts shown in FIG. 7, the following description explains an interrupt which occurs before the operation to output the code of the JMP instruction from the JMP-instruction-code ROM unit 120 is completed. Let an address PC1+2 be stored in the register 44 as the start address of a specific area in the RAM unit. As shown in FIG. 7(m), let a request for an interrupt be made in cycle #1. At that time, since the CPU 110 is executing an instruction, the request for an interrupt is accepted after the completion of the execution of the instruction. As a result thereof, the microcomputer carries out processing in cycles #1 to #8 shown in FIG. 7 as if no request for an interrupt had been made. In other words, the processing carried out by the microprocessor in cycles #1 to #8 shown in FIG. 7 is the same as the processing carried out in cycles #1 to #8 shown in FIG. 6. It should be noted that the timing charts shown in FIGS. 7(a) to 7(k) correspond to the timing charts shown in FIGS. 6(a) to 6(k) respectively. At the end of cycle #8, the contents of the program counter in the CPU 110 are PC1+2 as shown in FIG. 7(d) much like the case shown in FIG. 6.

Since a request for an interrupt has been made, the CPU 110 starts a branch according to the request for an interrupt at the end of cycle #8 at which the execution of the current instruction is completed. The contents of the program counter in the CPU 110, that is, the address PC1+2 are saved and the start address of an interrupt handling program is set to the program counter. Therefore, in actuality, the address PC1+2 is not output as the address data 62. In addition, the contents of the queue buffer 2 are cleared by the branch-generation signal 68. The interrupt handling program is also stored in the ROM unit 40. Thereafter, the CPU 110 inputs codes of instructions composing the interrupt handling program requested by the CPU 110 from the ROM unit 40.

In the case of the third embodiment, since the address data 62 output by the CPU 110 is input directly to the comparison circuit 46, the match signal output by the comparison circuit 46 does not rise to the H level even if the interrupt occurs during the execution of an instruction stored at an address immediately preceding the address PC1+2. Therefore, the signal output by the latch circuit 14 is not set to the H level. For this reason, the CPU 110 is not connected to the JMP-instruction-code ROM unit 120. Accordingly, the CPU 110 can execute the interrupt handling program stored in the ROM unit 40 without any problems.

As the execution of the interrupt handling program is completed, the contents of the program counter in the CPU 110 are restored to its original state, that is, to the address PC1+2. Thus, the CPU 110 outputs the address PC1+2 as the address data 62. As a result thereof, since the comparison circuit 46 sets the match signal to the H level, the operation to output the code of a JMP instruction from the JMP-instruction-code ROM unit 120 to the CPU 110 is started.

As described above, in a microcomputer having a queue buffer 2 for prefetching instructions according to the third embodiment, an interrupt handling program can be executed normally even if the request for the interrupt is made while the code of a JMP instruction is reading out from a JMP-instruction-code ROM unit 120. In the event of such a request for an interrupt, the operation to read out the code of a JMP instruction from the JMP-instruction-code ROM unit 120 is suspended. Instead, codes of instructions are read out sequentially one after another starting with the one at the start address of the interrupt handling program from a ROM unit 40 and supplied to the queue buffer 2.

In the embodiments described above, the JMP-instruction-code ROM unit 120 or the software-interrupt instruction-code ROM unit 122 is used for storing a branch instruction only. It should be noted, however, that they can also be used for storing other instructions as well if necessary. In addition, the register 44 can also be used for storing a plurality of address information. In this way, a plurality of JMP-instruction-code ROM units 120 or software-interrupt instruction-code ROM units 122 can be provided. It is also worth noting that the length of the register 44 expressed in terms of bits does not necessarily have to match the length of the address bus 48. If the entire address space of the ROM unit 40 can be accessed by means of an address having fewer bits than the address bus 48, the register 44 can have a length shorter than that of the address bus 48 when expressed in terms of bits.

In the embodiments described so far, the ROM unit 40 is embedded in the microcomputer. It should be noted, however, that the ROM unit 40 can be provided externally to the microcomputer to give the same effects. In addition, the EEPROM unit for setting the start address of a program containing a bug to the register 44 and for storing a correct program in a specific area of the RAM unit can also be embedded in the microcomputer.

As described above, according to the first aspect of the present invention, since the microcomputer is adapted to include a ROM-output switching unit for enabling the operation to output data from a first ROM unit and disabling the operation to output data from a second ROM unit by means of a branch-generation signal or an instruction-code-end signal, the microcomputer exhibits an effect that a mechanism for solving a problem caused by a bug in a program stored in the first ROM unit can be made operative with a high degree of reliability even if a queue buffer is provided in the microcomputer.

According to the second aspect of the present invention, since the microcomputer is adapted to include a latch circuit which is put in a set state by a match signal from a comparison circuit for comparing address information stored in an address-information storing unit with address data on an address bus and put in a reset state by the branch-generation signal or the instruction-code-end signal, the microcomputer exhibits an effect that the states of the operations to output data from the first ROM unit and the second ROM unit are controlled by a signal generated by the latch circuit driven by the match signal, the branch-generation signal and the instruction-code-end signal, thereby allowing the mechanism for solving a problem caused by a bug in a program stored in the first ROM unit to operate with a high degree of reliability even if a queue buffer is provided in the microcomputer.

According to the third aspect of the present invention, since the microcomputer is adapted to further include:

a second logic circuit which controls data output from the first ROM unit by the output of the latch circuit being put in a reset state; and a fourth logic circuit which controls data output from the second ROM unit by the output of the latch circuit being put in a set state, the microcomputer exhibits an effect that the states of the operations to output data from the first and second ROM units are controlled by the second and fourth logic circuits in which the match signal, the branch-generation signal and the instruction-code-end signal are reflected, thereby allowing the mechanism for solving a problem caused by a bug in a program stored in the first ROM unit to operate with a high degree of reliability even if a queue buffer is provided in the microcomputer.

According to the fourth aspect of the present invention, since the microcomputer is adapted to include:

a latch circuit which is put in a set state when a comparison circuit outputs the match signal indicating that the address information stored in an address-information storing unit matches the contents of a program counter in the CPU and put in a reset state by the instruction-code-end signal indicating the completion of an operation to output an instruction from the second ROM unit; and a switch circuit for disabling an operation to supply an instruction from a queue buffer to a CPU and for enabling an operation to supply an instruction from a second ROM unit to the CPU when the latch circuit is in a set state, the microcomputer exhibits an effect that an interrupt handling program can be executed normally even if, for example, an interrupt occurs while data is being read out from the second ROM unit, thereby allowing a mechanism for solving a problem caused by a bug in a program stored in the first ROM unit to operate with a high degree of reliability even if a queue buffer is provided in the microcomputer.

What is claimed is:

1. A microcomputer comprising:

a queue buffer for prefetching each instruction of a program stored in a first ROM prior to execution of the instruction by a CPU, contents of said queue buffer being cleared by a branch-generation signal for indicating completion of execution of a branch instruction by said CPU;

a second ROM for storing an instruction for branching to an address space outside an address space of said first ROM; and an address-information storing unit for storing address information, said microcomputer further comprising a ROM-output switching unit for comparing address information stored in said address-information storing unit with contents of a program counter of said queue buffer, for enabling an operation to output data from said second ROM and disabling an operation to output data from said first ROM when said address information matches said contents, and for enabling an operation to output data from said first ROM and disabling an operation to output data from said second ROM when said branch-generation signal or an instruction-code-end signal indicating that an instruction has been output from said second ROM is input.

2. A microcomputer according to claim 1 wherein said ROM-output switching circuit comprises a comparison circuit for comparing address information stored in said address-information storing unit with address data on an address bus, and a latch circuit which is put in a set state by a match signal from said comparison circuit and put in a reset state by said branch-generation signal or said instruction-code-end signal.

3. A microcomputer comprising:

a queue buffer for prefetching each instruction of a program stored in a first ROM prior to execution of the instruction by a CPU, contents of said queue buffer being cleared by a branch-generation signal for indicating completion of execution of a branch instruction by said CPU:

a second ROM for storing an instruction for branching to an address space outside an address space of said first ROM; and an address-information storing unit for storing address information, said microcomputer further comprising a ROM-output switching unit for comparing address information stored in said address-information storing unit with contents of a program counter of said queue buffer, for enabling an operation to output data from said second ROM and disabling an operation to output data from said first ROM when said address information matches said contents, and for enabling an operation to output data from said first ROM and disabling an operation to output data from said second ROM when said branch-generation signal or an instruction-code-end signal indicating that an instruction has been output from said second ROM is input;

wherein said ROM-output switching circuit comprises a comparison circuit for comparing address information stored in said address-information storing unit with address data on an address bus, and a latch circuit which is put in a set state by a match signal from said comparison circuit and put in a reset state by said branch-generation signal or said instruction-code-end signal, wherein said ROM-output switching circuit further comprises:

a first logic circuit for passing on a ROM-read signal from said queue buffer when said latch circuit is put in a reset state;

a second logic circuit for receiving data output from said first ROM and passing on or blocking said first ROM output data in accordance with a signal output by said first logic circuit;

a third logic circuit for passing on said ROM-read signal from said queue buffer when said latch circuit is put in a set state; and a fourth logic circuit for receiving data output by said second ROM and passing on or blocking said second ROM output data in accordance with a signal output by said third logic circuit.

4. A microcomputer comprising:

a queue buffer for prefetching each instruction of a program stored in a first ROM prior to execution of the instruction by a CPU, contents of said queue buffer being cleared by a branch-generation signal for indicating completion of execution of a branch instruction by said CPU;

a second ROM for storing an instruction for branching to an address space outside an address space of said first ROM;

an address-information storing unit for storing address information; and a comparison circuit for comparing address information stored in said address-information storing unit with contents of a program counter in said CPU, said microcomputer further comprising:

a latch circuit which is put in a set state by a match signal from said comparison circuit, said match signal indicating that address information stored in said address-information storing unit matches contents of said program counter in said CPU, and put in a reset state by an instruction-code-end signal indicating that said second ROM has output an instruction; and a switch circuit for disabling an operation to provide an instruction from said queue buffer to said CPU and enabling an operation to provide an instruction from said second ROM to said CPU when said latch circuit is put in a set state.

* * * * *